US005120994A

United States Patent [19]

Joly

[11] Patent Number: 5,120,994

[45] Date of Patent: Jun. 9, 1992

[54] BICMOS VOLTAGE GENERATOR

[75] Inventor: Robert Joly, Los Altos, Calif.

[73] Assignee: Hewlett-Packard Company, Palo Alto, Calif.

[21] Appl. No.: 628,976

[22] Filed: Dec. 17, 1990

[51] Int. Cl.[5] .............................................. H02K 3/01

[52] U.S. Cl. .............................. 307/296.6; 307/296.1; 323/313

[58] Field of Search ............... 307/296.1, 296.4, 296.7, 307/296.6, 494; 330/259; 323/311-313

[56] References Cited

U.S. PATENT DOCUMENTS

| | | | |
|---|---|---|---|
| 4,287,439 | 9/1981 | Leuschner | 307/310 |
| 4,325,018 | 4/1982 | Schade, Jr. | 323/313 |
| 4,359,680 | 11/1982 | Hellums et al. | 323/313 |
| 4,450,367 | 5/1984 | Whatley | 307/297 |
| 4,525,663 | 6/1985 | Henry | 323/280 |
| 4,553,048 | 11/1985 | Bynum | 307/350 |
| 4,593,208 | 6/1986 | Single | 307/296 R |
| 4,607,174 | 8/1986 | Shoji | 307/296.6 |
| 4,751,454 | 6/1988 | Dielacher et al. | 323/314 |
| 4,769,589 | 9/1988 | Rosenthal | 323/313 |
| 4,780,624 | 10/1988 | Nicollini et al. | 307/296 R |
| 4,792,750 | 12/1988 | Yan | 323/315 |
| 4,820,967 | 4/1989 | Kertis et al. | 323/314 |
| 4,902,915 | 2/1990 | Tran | 307/296.6 |
| 4,906,863 | 3/1990 | Tran | 307/296.7 |
| 5,001,362 | 3/1991 | Tran | 307/296.4 |

OTHER PUBLICATIONS

Publication: D. A. Hodges and H. G. Jackson, Analysis and Design of Digital Integrated Circuits (1983), pp. 279 through 283.

Publication: "Current Reference Suits Large ECL Chips", *Electronic Design* (Apr. 13, 1989), p. 33.

*Primary Examiner*—Eugene R. LaRoche

*Assistant Examiner*—A. Zarabian

[57] ABSTRACT

A bias network for providing the ECL reference voltages $V_{REF1}$ and $V_{REF2}$. Bipolar npn transistors are arranged to receive the collector terminal potentials of the emitter-coupled pair of the bias network. The npn transistors form the input devices of a differential amplifier that includes a pair of FETs arranged as a current mirror. One of each of such FETs is in series with each of the input transistors. The differential amplifier regulates the potential at an internal node of the bias network to thereby maintain the operating point of the network so that the potentials of the collector terminals are equal. As a result the bias network is rendered substantially insensitive to both temperature and supply voltage variations.

14 Claims, 5 Drawing Sheets

BICMOS VOLTAGE GENERATOR

BACKGROUND

1. Field of the Invention

The present invention relates to circuits for generating specified voltage levels. More particularly, this invention pertains to an improved bias network for providing ECL reference voltages.

2. Background of the Invention

Emitter-coupled logic (ECL) circuits comprise a very useful family of digital integrated circuits. ECL originated long before the invention of integrated circuits. The IC process has permitted the development of such circuits so that ECL is currently the fastest commercially available form of digital IC with typical propagation delay times of less than 1 ns and clock rates approaching 1 GHz.

ECL circuits are based upon the non-saturating current switch, also known as the emitter-coupled pair. By careful choice of circuit parameters (including supply current) the basic ECL circuit can be designed so that the bipolar transistors in the current switch do not saturate, contributing to the short propagation delay time typical of ECL circuits.

BiCMOS chips with ECL I/O's generally operate between ground and a supply voltage of approximately −5 volts, requiring a reference voltage $v_1$ of approximately −1.3 volts. In the event that full ECL stages are also implemented, an additional reference voltage $v_2$ about 1.2 volts above the supply voltage ($V_{ss}$) is required.

The reference voltages should be maintained as independent as possible of both temperature and supply voltage to maintain stable logic reference voltage and output voltage levels. Unfortunately, both of these critical values are affected by temperature and supply voltage. The shifting of the voltage transfer characteristic introduces design problems that are particularly acute in large digital systems that incorporate many smaller units, each subjected to a separate supply voltage and ambient temperature.

Conventionally, attempts to obtain temperature independent biasing have followed a number of approaches. In one approach, a Zener diode reference is employed, requiring large voltages. As an alternative, a band-gap reference can be employed that combines a voltage having a negative temperature coefficient (e.g. a base-emitter voltage) with one having a positive temperature coefficient (i.e., voltage proportional to the thermal voltage $V_T=kT/q$ where k=Boltzmann constant, T=temperature, q=electron charge). A bias network of the latter type is disclosed in FIG. 1.

While some success has been experienced in overcoming temperature effects, efforts to counteract supply voltage irregularities have been less successful in the prior art. A common method for compensating such variations has been the addition of a shunt transistor that acts as a regulator, holding the collector current of a transistor of the voltage generator constant. Unfortunately, such arrangement requires the use of a pnp transistor as the shunt element. As a result, the fabrication of an adequate device is significantly complicated by the inherently lateral geometry of pnp devices (npn transistors, on the other hand are vertical geometry devices). The fabrication of vertical pnp devices can be quite difficult and costly. Furthermore, it is well recognized that pnp transistors are significantly slower than npn devices.

SUMMARY OF THE INVENTION

The present invention addresses and overcomes the shortcomings of the prior art by providing, in a first aspect, an improvement to a bias network for providing a first and a second ECL reference voltage. The improvement is directed to a bias network of the type that includes a first bipolar transistor whose base is connected to that of a second bipolar transistor, the emitter of the second transistor being connected to a first power terminal and that of the first transistor being connected to the first power terminal through a resistor. The collectors of the transistors are connected to a common node through resistors. A third bipolar transistor has an emitter connected to the node. In a bias network of the above-described type, the present invention provides an improvement for stabilizing such a network against changes in the supply voltage applied to the first power terminal by providing a differential amplifier for adjusting the potential voltage of the base of the third bipolar transistor to equalize the potentials at the collector terminals of the first and second bipolar transistors.

In another aspect, the invention provides a method for controlling an ECL bias network of the type that includes a first bipolar transistor whose base is connected to that of a second bipolar transistor. The emitter of the second transistor is connected to a first power terminal and that of the first transistor is connected to the first power terminal through a resistor. The collectors of the transistors are connected to a common node through resistors and a third biploar transistor has an emitter connected to the common node. In such an ECL bias network arrangement, the method of the invention comprises the step of regulating the voltage at the common node so that the voltages of the collector terminals of the first and second transistors are equalized.

The preceding and other features and advantages of this invention will become further apparent from the detailed description that follows. This description is accompanied by a set of drawing figures. Numerals of the drawing figures, correspond to those of the written description, point to the various features of the invention, like numerals referring to like features throughout both the detailed written description and the drawing figures.

DETAILED DESCRIPTION

Figure 1:
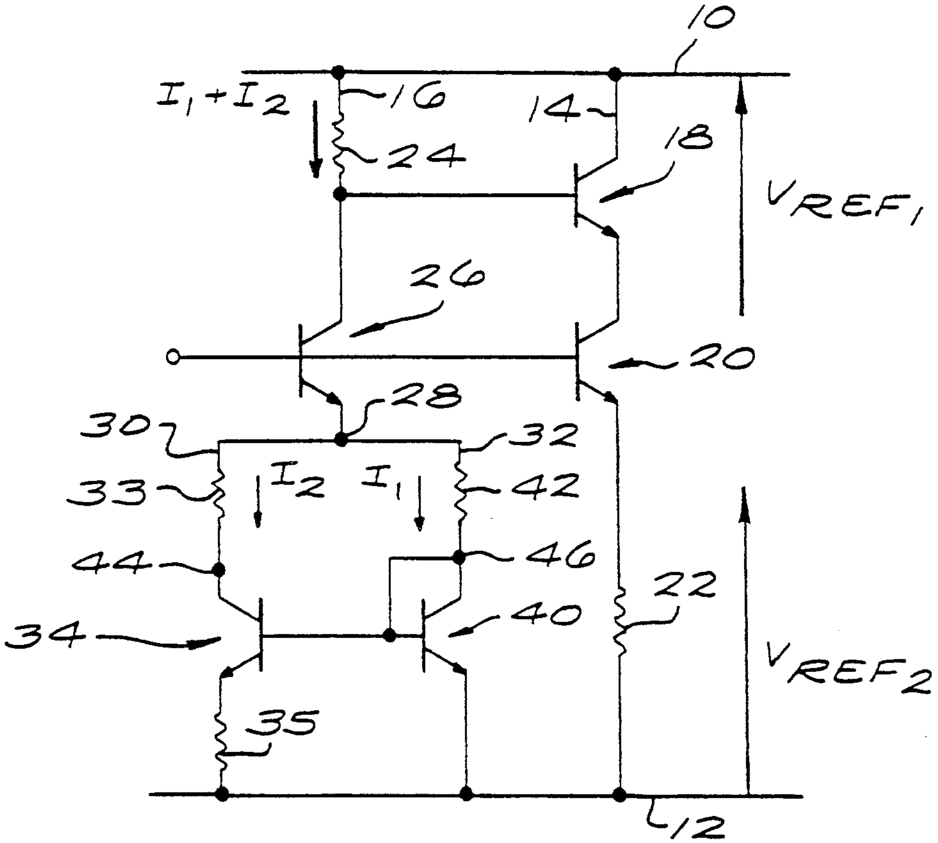
FIG. 1 PRIOR ART
FIG. 1 is a schematic diagram of an ECL bias network in accordance with the prior art.

FIG. 1 is a schematic diagram of a common circuit arrangement for supplying the reference voltages $V_{REF1}$ and $V_{REF2}$ required by ECL logic circuits. Such a network, which includes a mechanism (discussed below) for counteracting the effect of temperature upon bias voltages, in particularly useful in conjunction with 100 k series ECL.

The bias network is interposed between a first power terminal 10 and a second power terminal 12. BiCMOS chips with ECL I/O's generally operate between ground and −5 volts, the first power terminal 10 being maintained at ground and the second power terminal 12 being maintained at −5 volts in the arrangement according to FIG. 1. Parallel circuit branches 14 and 16 connect the first power supply terminal 10 to the second power supply terminal 12.

The circuit branch 14 comprises npn bipolar transistors 18 and 20 which are serially connected as shown. A resistor 22 is interposed between the emitter of the transistor 20 and the second power supply terminal 12.

The circuit branch 16 comprises a resistor 24 which is interposed between the first power supply terminal 10 and the collector terminal of a npn bipolar transistor 26. The base of the transistor 18 of circuit branch 14 is connected to the collector terminal of the transistor 26 while the base of the transistor 26 is connected to the base of the transistor 20 of the circuit branch 14.

The emitter terminal of the transistor 26 is connected to a node 28 whereby a voltage level is determined for application to parallel circuit sub-branches 30 and 32.

The sub-branch 30 comprises a serial arrangement of a resistor 33, an npn transistor 34 and a resistor 35 which is located between the emitter terminal of the transistor 34 and the second power supply terminal 12 as shown.

The sub-branch 32 includes an npn bipolar transistor 40 whose emitter terminal is directly connected to the second power supply terminal 12 and whose base is connected to the base of the bipolar transistor 34 of the sub-branch 30. A resistor 42 is located between the collector terminal of the transistor 40 and the node 28.

The operation of an ECL bias network of the type illustrated in FIG. 1 is well known. Assuming the bipolar transistors to b ideal devices with negligible base current and $I_C=I_E=I_S\exp(V_{BE}/V_T)$ where $I_S$ is the saturation current and further assuming that the base voltage of the transistor 26 is such that the voltages at nodes 44 of sub-branch 30 and 46 of sub-branch 32 are identical, the analysis set forth below applies:

$$R_{42}\, i_{32}=R_{33}\, i_{30} \quad (1)$$

$$i_{32}=I_{S40}\exp(V_{BE40}/V_T) \quad (2)$$

$$i_{30}=I_{S34}\exp((V_{BE40}-R_{35}\, i_{30})/V_T) \quad (3)$$

It follows that:

$$R_{33}/R_{42}=i_{32}/i_{30}=(I_{S40}/I_{S34})\exp(R_{35}i_{30}/VT) \quad (4)$$

Thus:

$$i_{30}=(V_T/R_{35})\, ln\, (R_{33}I_{S34}/R_{42}I_{S40}) \quad (5)$$

$$i_{32}+i_{30}=(R_{33}/R_{42}+1)(V_T/R_{35})ln(R_{33}I_{S34}/R_{42}I_{S40}) \quad (6)$$

Accordingly, the two reference voltages are as follows:

$$V_{REF1}=R_{24}(i_{32}+i_{30})+V_{BE18}=V_T(R_{24}/R_{35})(R_{33}/R_{42}+1)ln(R_{33}I_{S34}/R_{42}I_{S40})+V_{BE18} \quad (7)$$

$$V_{REF2}\approx V_{28}-V_{12}=R_{42}i_{32}+V_{BE40}=V_T(R_{33}/R_{35})ln(R_{33}I_{S34}/R_{42}I_{S40})+V_{BE40} \quad (8)$$

Note that $V_{REF2}-(V_{28}-V_{12})=V_{BE26}-V_{BE20}=V_T(ln((i_{32}+i_{30})/I_{S26})-ln(V_{REF2}/R_{22}I_{S20}))$ is small but may not be exactly zero. For example, $\Delta V_{BE}=V_T\, ln\, 2=18$ mv for two identical transistors and a collector current ratio of 2.

The temperature coefficient of $V_{BE}$ is negative ($\approx -1.5$ mv/°c.) and its absolute value decreases as $I_c$ increases. The voltage drops across $R_{24}$ and $R_{42}$ depend solely upon the ratios of the resistances and saturation currents. Temperature variations of $R_{35}$, $R_{42}$, $R_{33}$ and $R_{24}$ cancel if the resistors have the same temperature coefficient while $I_{S40}/I_{S34}$ is temperature-invariant for transistors of the same type.

The voltage drop across the resistor 24 is obtained from equation 7 as:

$$V_{24}=V_T(R_{24}/R_{35})(R_{33}/R_{42}+1)ln(R_{33}I_{S34}/R_{42}I_{S40}) \quad (9)$$

The temperature dependence of the reference voltages provided by the circuit of FIG. 1 can be illustrated as follows. Assuming the resistance ratios and the saturation current ratios to be temperature independent, it follows that $V_{24}$ is linear in T and therefore $\Delta V_{24}/\Delta T=V_{24}/T$. For example, if $V_{24}=500$ mV and T=300 degrees K., then $\Delta V_{24}/\Delta T=500/300=167$ mV/degree C. and $\Delta V_{REF1}/\Delta T=\Delta V_{24}/\Delta T+\Delta V_{BE18}/\Delta T\approx 1.67-1.5=0.17$ mV/degree C. and $V_{REF1}\approx 500+800=1.3$ V. A similar analysis applies to $V_{REF2}$. Thus, the circuit of FIG. 1 employs a voltage having a negative temperature coefficient with one having a positive coefficient to obtain temperature independent biasing. Accordingly, the values of $V_{REF1}$ and $V_{REF2}$ provided are substantially invariant with temperature. However, as may be recalled, this analysis has proceeded from the assumption that $V_{44}=V_{46}$. That is, the temperature invariance of the reference voltages follows from the presumed equality of the potentials of the nodes 44 and 46.

Figure 2:
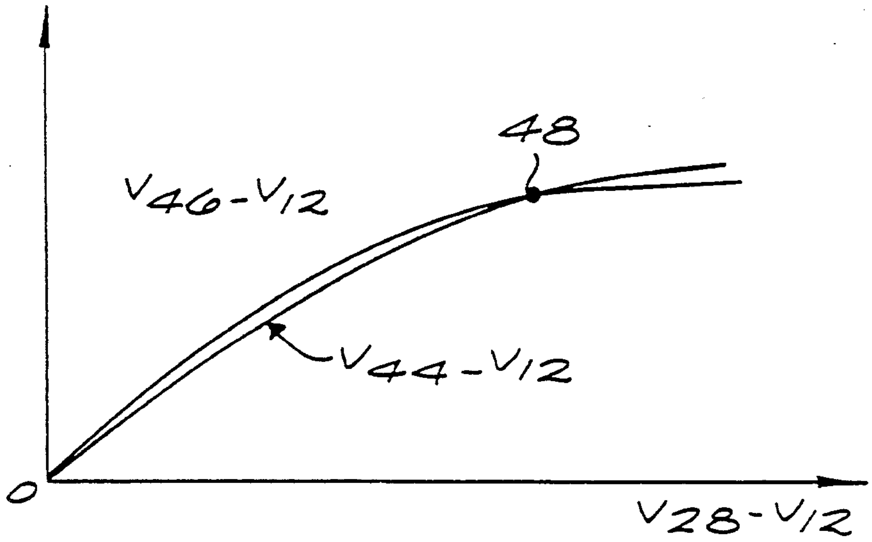
FIG. 2 is a graph that demonstrates the voltage behavior at preselected nodes of the prior art network.

FIG. 2 is a graph illustrating the potentials of the nodes 44 and 46 (relative to the supply voltage) as a function of the potential at the node 28. The stable operating point of the circuit, indicated at 48, occurs when the two nodes 44 and 46 are at the same potential. The potential of the node 28 increases with an increase in the current in the circuit branch 16. As shown, at low current the voltage drop across the resistor 35 of the circuit sub-branch 30 is negligible. Accordingly, assuming that the saturation current of the transistor 34 exceeds that of the transistor 40, the current in the sub-branch 30 exceeds that of the sub-branch 32 and the potential of the node 44 is less than that of the node 46.

At higher current, $V_{BE34}$ is significantly reduced by the increased voltage drop across the resistor 35. At the higher current, the current in the sub-branch 32 exceeds that in the sub-branch 30 and the potential of the node 44 exceeds that of the node 46. As shown below, the present invention forces the circuit of FIG. 1 to the crossover operating point 48 of FIG. 2. The invention achieves such favorable operation of the circuit by employing a BiCMOS differential amplifier with inputs tied to the nodes 44 and 46 and output linked to the base of the transistor 26. A high amplifier gain corresponds to nearly identical voltages at the nodes 44 and 46 and a low sensitivity of $V_{REF1}$ and $V_{REF2}$ to the supply voltage $V_{12}$. From the preceding analysis, it will be appreciated that, by equalizing the potentials of the nodes 44 and 46, the condition for temperature invariance of $V_{REF1}$ and $V_{REF2}$ is achieved. Accordingly, the invention addresses both temperature and supply voltage variations.

Figure 3:
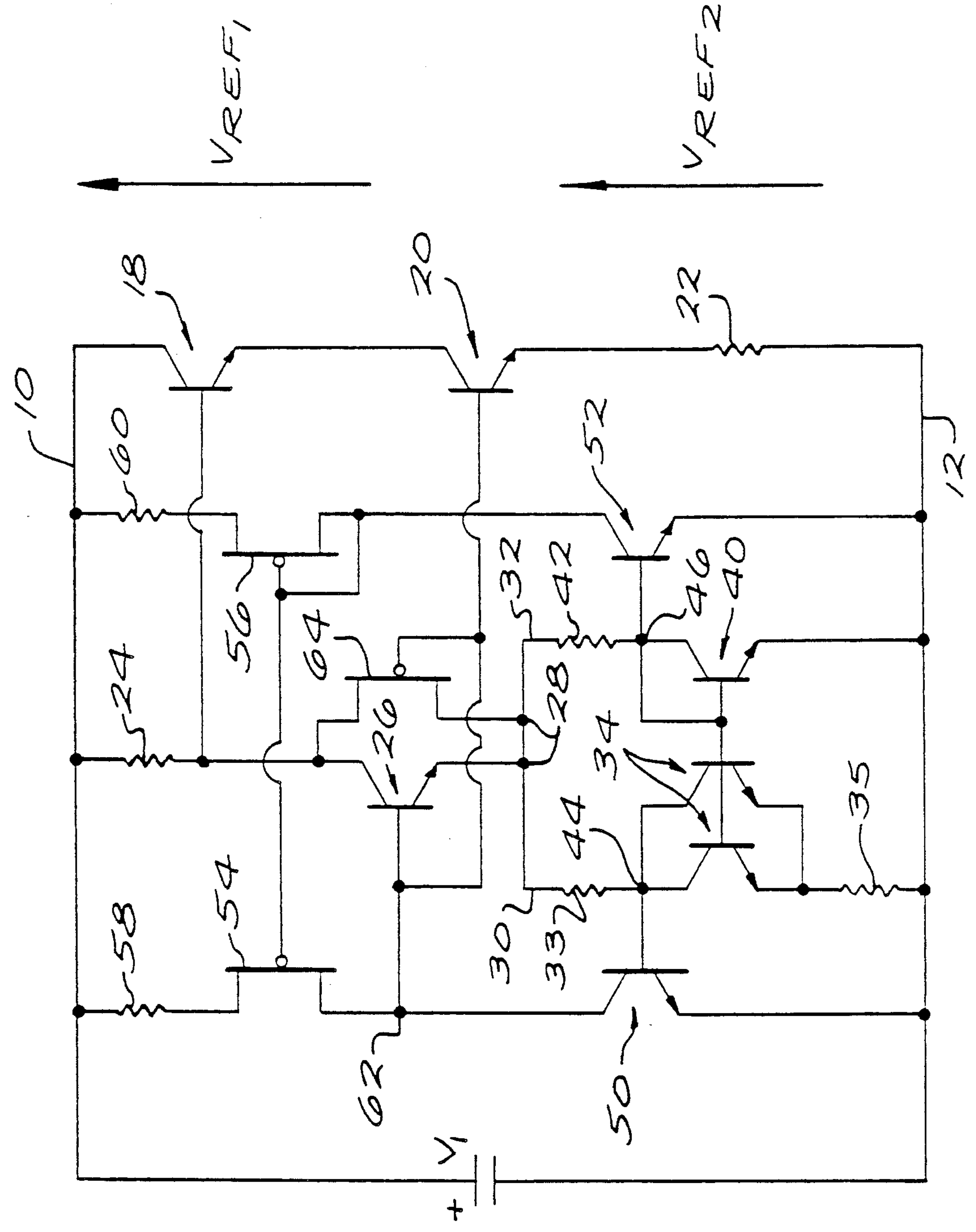
FIG. 3 is a schematic diagram of an improved ECL bias network in accordance with the invention.

FIG. 3 is a circuit schematic diagram of an improved ECL bias network in accordance with the invention. The elements of the conventional ECL bias network with temperature compensation of FIG. 1 are indicated by corresponding numerals to simplify the description.

The potentials of the nodes 44 and 46 are maintained at the operating point 48 by means of a differential amplifier that includes the npn bipolar transistors 50 and 52 as input devices. P-channel FETs 54 and 56 are arranged in a mirror configuration. As will be shown below, such a configuration is well suited for asymmetric output. Resistors 58 and 60 increase the output impedance of the p-channel FET 54 at node 62 and thus increase the gain of the differential amplifier. A p-channel FET 64 connects the collector terminal of the npn transistor 26 with the node 28. In the absence of the FET 64, the circuit of FIG. 3 would have a stable operating point with all the transistors off and $V_{REF1}$=-$V_{REF2}$=0. As will be shown, the FET 64 assures that the supply voltage is transmitted to the node 28 when this occurs, preventing the circuit from becoming "stuck" in the quiescent state.

In operation, assuming that the bipolar transistors 50 and 52 of the differential amplifier are off, the nodes 28 and 62 are both at ground. The transistor 20 is also off, its base voltage being less than 600 mv above ground so that $V_{REF2}=0$. As mentioned, the presence of the p-channel FET 64 assures that this situation cannot remain in effect. The low base voltage of the transistor 20, which is applied to the gate of the FET 64, turns that FET on and pulls the node 28 to the level of the first voltage supply terminal 10. As a result, the bias network comprising the circuit sub-branches 30 and 32 is activated and the differential amplifier can operate as described below to protect the bias network from swings in the supply voltage. The circuit operates properly as long as the FET 64 does not act as a short circuit, stealing the current from the transistor 26. The result of the presence of the FET 64 is small, $V_{REF1}$ being unchanged with $V_{REF2}$ decreasing slightly due to a small reduction in $V_{BE26}$.

As is well known, in a differential amplifier even a small difference between the two input voltages can produce a large change in the output. In operation, the potentials of the nodes 44 and 46 serve as the inputs to the differential amplifier defined above. Further, as also mentioned above, the proper operation of the network depends upon the circuit functioning at an operating point characterized by equality of the potential voltages at the two nodes. As shown in FIG. 2, the operating point of the bias network is a function of the value of the potential at the node 28. Fluctuations in the supply voltage at the first voltage supply terminal 10 effect the potential voltage at the node 28, disturbing the circuit's operation by creating an imbalance between the potentials at the nodes 44 and 46.

Assuming that the transistors 50 and 52 are identical, equal currents flow through the left and right hand branches of the differential amplifier when the potentials at the nodes 44 and 46 are equal. When, for example, the potential of the node 46 rises above that of node 44 in reponse to a fluctuation in the potential of the node 28, corresponding changes in the magnitudes of the currents flowing through the transistors 50 and 52 occur. That is, the current flow through the transistor 52 will increase relative to that through the transistor 50 as a result of the increased forward biasing of the npn transistor 52. The increased flow of current through the transistor 52 produces an increase in the flow of current through the p-channel FET 56 whose drain is attached to the collector of the transistor 52.

The mirror configuration of the FETs 54 and 56 results in a corresponding increase in the magnitude of the current flow through the FET 54. As one can see, the net result of the imbalance between the potentials of the nodes 44 and 46 is the transfer of the increased current flow to the upper half of the left hand branch of the differential amplifier which initially experienced a decreased current flow due to a decrease in the forward biasing of the transistor 34.

The increased flow of current in (the upper half of) the left hand branch of the differential amplifier will pull up the potential at the node 62. The voltage value of the node 62 is transmitted to the base of the npn transistor 26 and the gate of the p-channel FET 64 in addition to the base of the npn transistor 20.

The transistor 26 is arranged in a source-follower configuration. That is, the potential at the emitter terminal of the transistor 26 is always 0.7 volts lower than the potential of the base 26 provided that the transistor 26 is on. In the present example, an increase in the potential at the node 62 will accordingly produce a corresponding increase in the potential at the node 28 that is coupled to the emitter terminal of the transistor 26. Referring to FIG. 2, this increase at the node 28 equalizes the potentials at the nodes 44 and 46, the desired operating point of the circuit. It will be readily appreciated that a corresponding analysis can be applied to operation of the differential amplifier when the potential at the node 44 exceeds that at the node 46 to produce a decrease in the potential at the node 28 effecting a decrease in the potential of the node 44 relative to that at the node 46, thus again driving the bias network to the desired operating point.

Figure 4A:
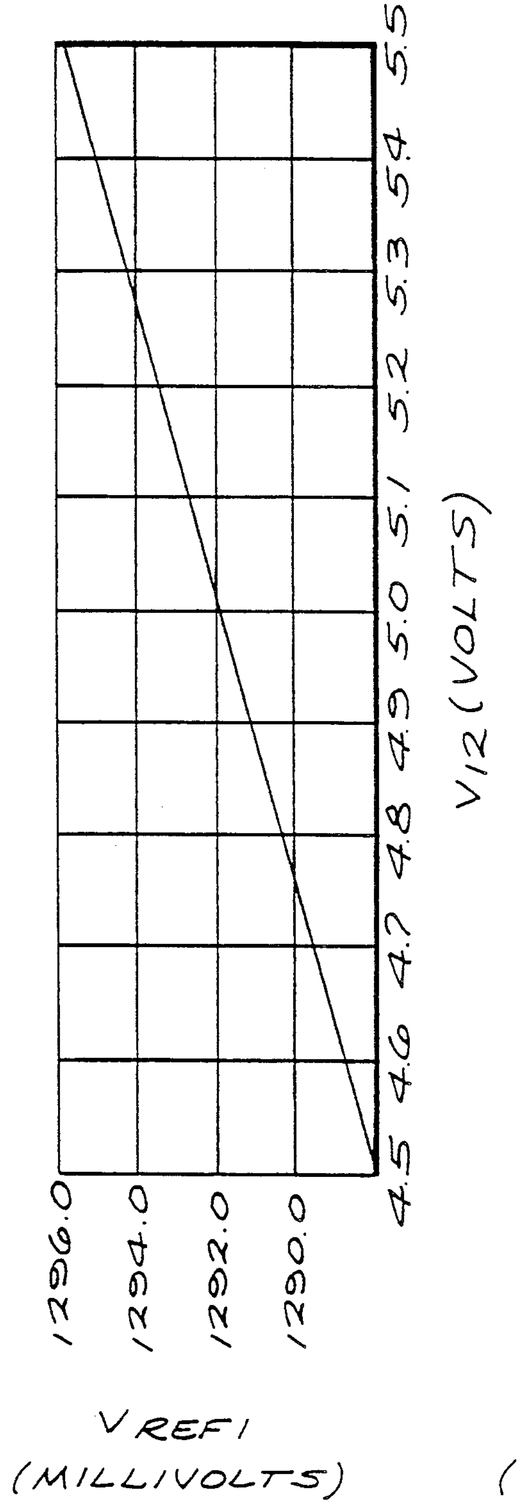
FIGS. 4(*a*) and 4(*b*) are curves of the relationship between the supply voltage and $V_{REF1}$ and $V_{REF2}$ respectively from a simulation of the invention at 25 degrees Centigrade.
Figure 4B:
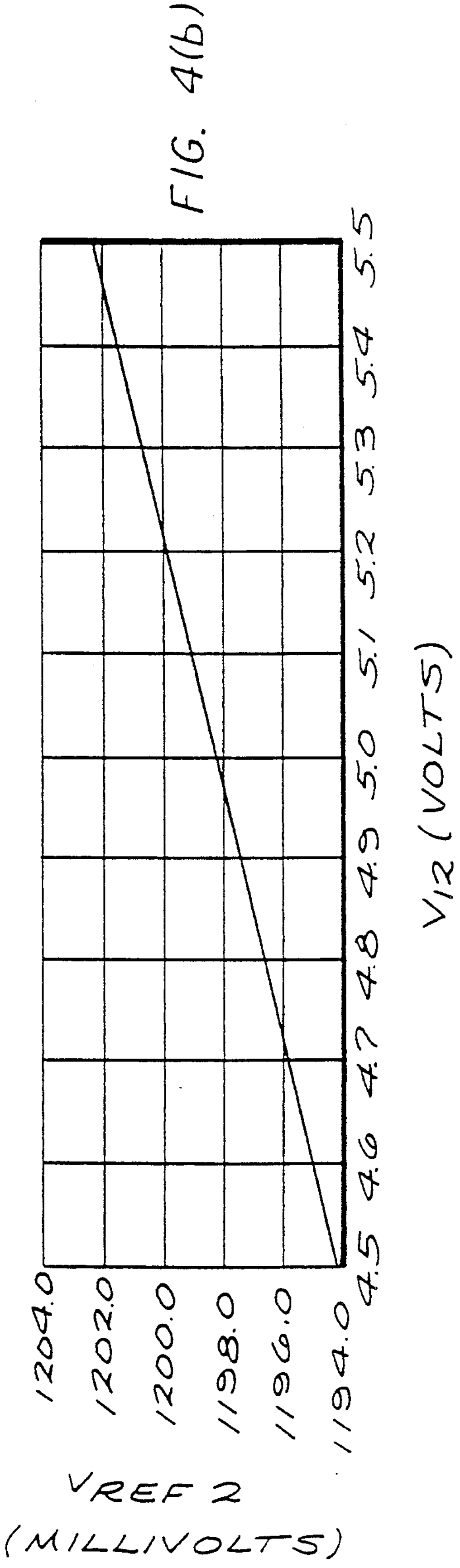

The operation of a voltage generator incorporating teachings of the invention is disclosed in FIGS. 4(*a*), 4(*b*), 5(*a*), 5(*b*), 6(*a*) and 6(*b*).

Figure 5A:
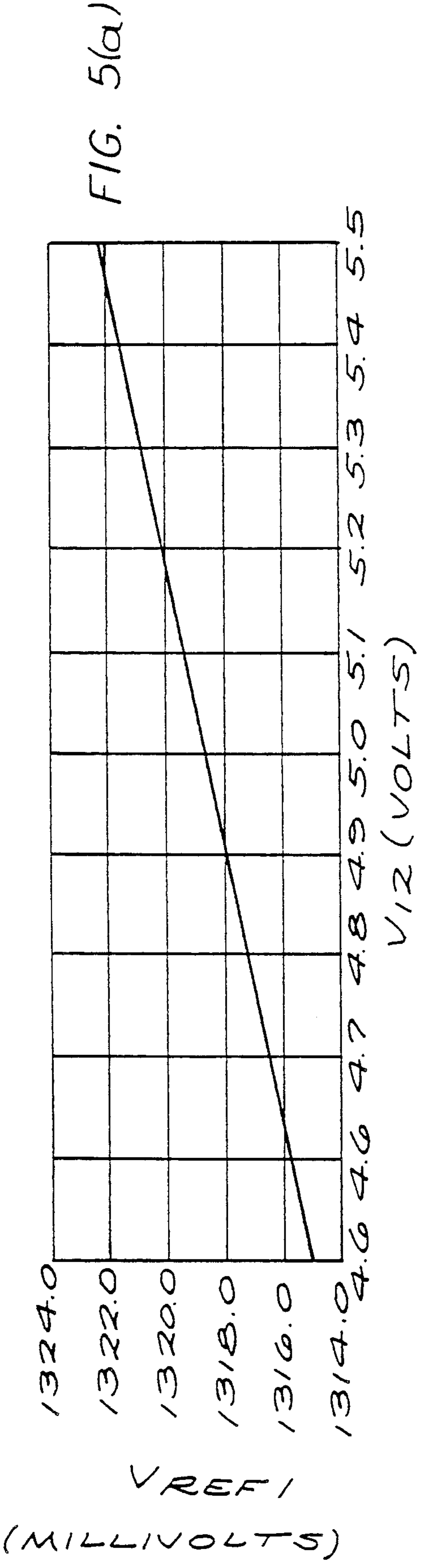
FIGS. 5(*a*) and 5(*b*) are curves of the relationship between the supply voltage and $V_{REF1}$ and $V_{REF2}$ respectively from a simulation of the invention at 125 degrees Centigrade.
Figure 5B:
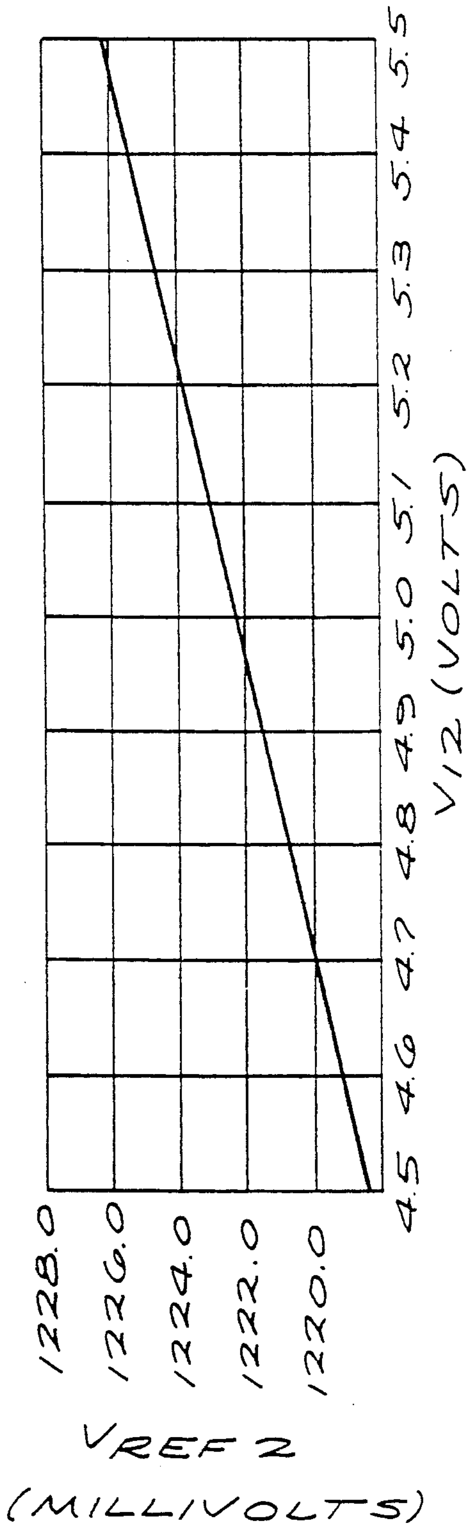

FIGS. 4(*a*) and 4(*b*) are curves of the relationship between the supply voltage and the voltages $V_{REF1}$ and $V_{REF2}$ respectively at 25 degrees Centigrade while FIGS. 5(*a*) and 5(*b*) provide the results of simulations at 125 degrees Centigrade. It can be seen from these figures that a change of less than 10 mv for each of $V_{REF1}$ and $V_{REF2}$ occurs for a 1 volt change in the supply voltage. Comparing the two graphs, $\Delta V_{REF1}/\Delta T=0.27$ mv/degrees Centigrade and $\Delta V_{REF2}/\Delta T=0.24$ mv/degrees Centigrade.

Figure 6A:
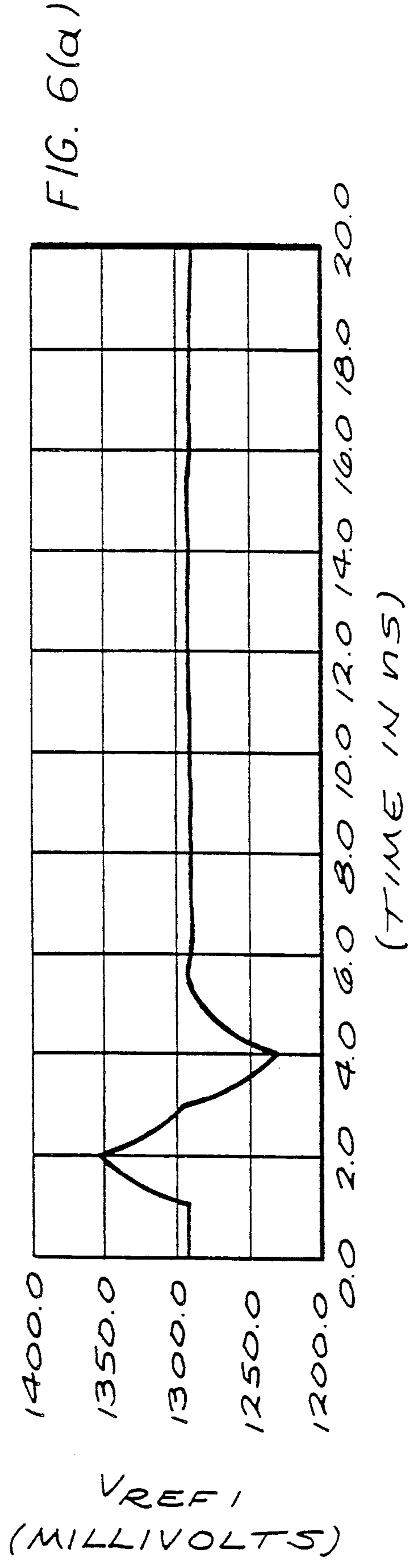
FIGS. 6(*a*) and 6(*b*) are curves of the response of a simulation of the invention to a pulse.
Figure 6B:
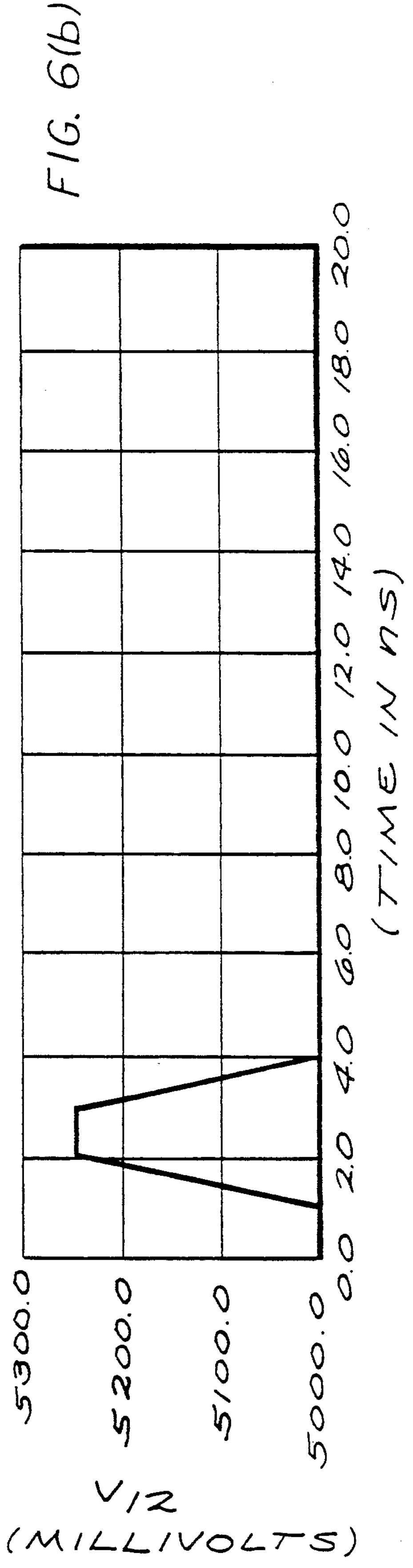

FIGS. 6(*a*) and 6(*b*) illustrate, in combination, the response of the voltage generator to a pulse (i.e. noise) superimposed on the supply voltage. It can be seen from the figures that less than 2 ns is required for the generator to recover from the perturbation. In the event of instability under high capacitive loading, a small capacitor can be tied to the high impedance node 62 to restore stability.

Thus it is seen that the present invention provides an improvement in a bias network for providing ECL reference voltages. By utilizing the teachings of this invention, one may reliably achieve the required ECL reference voltages even in the presence of temperature and supply voltage instabilities. By regulating and equalizing the voltages at selected nodes, the favorable temperature characteristic of the bias network is realized at the same time that the circuit is protected from supply voltage variations. The circuit is amenable to economical manufacture and reliable operation due to the absence of pnp devices.

While this invention has been described with reference to its presently preferred embodiment, it is not limited thereto. Rather, this invention is limited only insofar as defined by the following set of claims and includes all equivalents within its scope.

What is claimed is:

1. In a bias network for providing a first and a second ECL reference voltage, the network of the type that includes a first bipolar npn network transistor having a base connected to that of a second bipolar npn network transistor, the emitter of the second transistor being connected to a first power terminal and that of the first transistor being connected to said first power terminal through a resistor, the collectors of the transistors being connected to a common node through resistors and a third bipolar npn network transistor having an emitter connected to said common node, an improvement comprising a differential amplifier configured to adjust the potential voltage at the base of the third transistor to equalize the potentials at the collectors of the first and second transistors, the differential amplifier including:

a first bipolar npn input transistor having a base connected to the collector of the first network transistor, a second bipolar npn input transistor having a base connected to the collector of the second network transistor, a first p-channel FET having a drain connected to the collector of the first input transistor and a source connected to the second power supply terminal, a second p-channel FET having a drain connected to the collector of the second input transistor and a source connected to the second power supply terminal, and a third FET connecting the collector of the third network transistor to said common node, the third FET having a gate connected to the drain of said first FET.

2. An improvement as in claim 1 wherein the third FET is a p-channel FET having a source connected to the collector of said third network transistor and to said second power terminal and a drain connected to said common node.

3. A method of controlling an ECL bias network of the type that includes first, second and third bipolar network transistors, the first transistor having a base connected to that of the second transistor, the second transistor having an emitter connected to a first power terminal, the first transistor having an emitter connected to the first power terminal through a resistor, collectors of the first and second transistors being connected to a common node through resistors, the third transistor having an emitter connected to the common node, the method comprising:

regulating the voltage at the common node so that voltages of the collectors of said first and second transistors are equal by controlling the voltage at the base of the third transistor, controlling the voltage at said base being accomplished by means of:

a differential amplifier, the differential amplifier having a first npn input transistor in connection with the collector of the first network transistor, a second npn input transistor in connection with the collector of the second network transistor, and first and second p-channel amplifier FETs connected as a current mirror wherein the first FET is in series with the first input transistor and the second FET is in series with the second input transistor, and a third p-channel FET connected between the collector of the third transistor and said common node.

4. A method as defined in claim 3 wherein the voltage at the drain of said first amplifier FET is applied to the gate of said first amplifier FET.

5. A bias network for providing an ECL reference voltage, the network comprising:

a first network transistor having an emitter in electrical communication with a first power supply line terminal and a collector in electrical communication with a common node;

a second network transistor having an emitter in electrical communication with the first power terminal and a collector in electrical communication with the common node;

a third network transistor having an emitter in electrical communication with the common node and a collector in electrical communication with a second power supply line terminal;

means in electrical communication with the network transistors for deriving a reference voltage from the power supply line; and a differential amplifier having a first input that receives an electrical potential at the collector of the first transistor, a second input that receives an electrical potential at the collector of the second transistor, and an output that provides a control signal to the third transistor, the control signal operative to equalize the potentials at the collectors of the first two transistors and thereby maintain the reference voltage at a constant level notwithstanding any power supply line variations.

6. A network as in claim 5 wherein the means for deriving a reference voltage is operative to derive two reference voltages and wherein the control signal maintains both reference voltages at constant levels notwithstanding any power supply line variations.

7. A network as in claim 5 wherein the differential amplifier comprises a first input transistor in electrical communication with the collector of the first network transistor and a second input transistor in electrical communication with the collector of the second network transistor.

8. A network as in claim 5 wherein the differential amplifier comprises a current mirror circuit.

9. A network as in claim 8 wherein the current mirror circuit comprises first and second current transistors.

10. A network as in claim 5 and further comprising a state control transistor in parallel connection with the third network transistor and operative to prevent the network from remaining in a quiescent state.

11. A network as in claim 10 wherein the state control transistor comprises a field effect transistor.

12. A method of regulating a reference voltage provided by an ECL bias network of the type that includes first, second and third network transistors, the first and second transistors having emitters in electrical communication with a first power supply line terminal and collectors in electrical communication with a common node and the third transistor having an emitter in electrical communication with the common node and a collector in electrical communication with a second power supply line terminal, the method comprising:

comparing electric potentials at the collectors of the first and second transistors;

deriving a control signal having a magnitude determined by any difference between said potentials; and applying the control signal to the third transistor so as to equalize said potentials and thereby maintain the reference voltage at a constant level notwithstanding any power supply line variations.

13. A method as in claim 12 and further comprising applying the control signal to the third transistor so as to regulate a second reference voltage provided by the network such that both reference voltages are maintained at constant levels notwithstanding any power supply line variations.

14. A method as in claim 12 and further comprising applying the control signal to the third transistor so as to prevent the network from remaining in a quiescent state.

* * * * *